(12) United States Patent
Krein et al.

(10) Patent No.: US 9,116,692 B1
(45) Date of Patent: Aug. 25, 2015

(54) SYSTEM AND METHOD FOR IMPROVING POWER CONVERSION FOR ADVANCED ELECTRONIC CIRCUITS

(75) Inventors: Philip T. Krein, Champaign, IL (US); Roy H. Campbell, Champaign, IL (US); Naresh R. Shanbhag, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 443 days.

(21) Appl. No.: 13/316,283

(22) Filed: Dec. 9, 2011

Related U.S. Application Data

(60) Provisional application No. 61/422,036, filed on Dec. 10, 2010.

(51) Int. Cl.
*G06F 1/26* (2006.01)
*G06F 1/32* (2006.01)

(52) U.S. Cl.
CPC ............ *G06F 1/3203* (2013.01); *G06F 1/3243* (2013.01); *Y02B 60/1282* (2013.01)

(58) Field of Classification Search
CPC .. G06F 1/3203; G06F 1/3243; Y02B 60/1282
See application file for complete search history.

(56) References Cited

U.S. PATENT DOCUMENTS

| | | | | | |
|---|---|---|---|---|---|
| 5,461,266 | A | * | 10/1995 | Koreeda et al. | 307/125 |
| 5,815,724 | A | * | 9/1998 | Mates | 713/322 |
| 5,996,081 | A | * | 11/1999 | Shim | 713/320 |
| 6,657,318 | B2 | * | 12/2003 | Ishikawa et al. | 307/30 |
| 6,934,898 | B1 | * | 8/2005 | Goff | 714/727 |
| 8,892,931 | B2 | * | 11/2014 | Kruglick | 713/340 |
| 2010/0332877 | A1 | * | 12/2010 | Yarch et al. | 713/323 |
| 2011/0093733 | A1 | * | 4/2011 | Kruglick | 713/340 |

* cited by examiner

*Primary Examiner* — M Elamin
(74) *Attorney, Agent, or Firm* — Klintworth & Rozenblat IP LLC

(57) ABSTRACT

A system includes a circuit having a plurality of electronic function blocks interconnected in series, a power source unit coupled to the circuit, for supplying power to the plurality of electronic function blocks, and a control unit coupled to each of the plurality of the electronic function blocks and to the power source unit. The control unit is configured to monitor activity levels of each of the electronic function blocks, and adjusts the activity level of each of the plurality of electronic function blocks. The control unit determines a voltage level suitable for the corresponding adjusted activity level, and adjusts the power supplied to each of the plurality of electronic function blocks in order to achieve the corresponding determined voltage level at each of the plurality of electronic function blocks.

20 Claims, 7 Drawing Sheets

SYSTEM AND METHOD FOR IMPROVING POWER CONVERSION FOR ADVANCED ELECTRONIC CIRCUITS

CROSS-REFERENCE TO RELATED APPLICATIONS

The present application claims priority under 35 U.S.C. §119(e) to U.S. Provisional Patent Application Ser. No. 61/422,036, filed Dec. 10, 2010, which is hereby incorporated herein by reference in its entirety.

BACKGROUND

Unless otherwise indicated herein, the materials described in this section are not prior art to the claims in this application and are not admitted to be prior art by inclusion in this section.

Conventionally, microprocessors are designed to operate at low voltages, typically about 1.2 volts (V), and future microprocessor operating voltages could be as low as 0.2 V, while their operating currents could be quite high, for example more than 100 amps (A). A known on-going trend aims for a general voltage reduction in most types of digital and analog electronic circuits. Memory circuits, communication circuits, analog-to-digital converters, and other applications are migrating to lower voltages.

A conventional parallel core interconnection of a four core microprocessor 100 is illustrated in FIG. 1. As shown, the four microprocessor cores 102 are connected to one another in parallel and to a voltage regulator module ("VRM") 104 supplying a low-voltage high-current power. Typically, high currents may require extensive wire connections, with dozens or even hundred of pins (not shown) dedicated to power supply and grounding. Moreover, voltage and current regulation can be made difficult by the connection lengths and extreme current slews. In many cases, there are further function blocks within an individual core, such as memory, arithmetic processing units (APUs), input-output interfaces (I/O), and others. An operating performance of these function blocks is typically optimum when they can operate at different voltage levels.

In general, the power consumed by processors and other digital circuits is proportional to the square of their input voltages, which may give incentive to seek a decrease of operating voltages. However, it is problematic to provide a tightly regulated power supply at low voltages and high currents in an efficient manner. In fact, there are fundamental limits to power conversion at these low voltages. For example, power converter losses are inversely proportional to the square of the power supply output voltage, which may offset the power consumption advantages in the power-supplied processor or digital circuits.

VRMs and other power supplies use relatively large transistors and other switching devices to keep their power losses low. These power supply designs can introduce a problem of dynamic performance because the power electronics needed to implement a power supply are inherently slow compared to the electronics used in modern digital circuits. Moreover, conventional power supplies provide their own output regulation. They are expected to maintain a substantially fixed output voltage regardless of the imposed load power.

Therefore, it would be beneficial to provide a power supply system and method that overcome the above discussed performance limitations incurred while supplying power to modern electronic circuits.

SUMMARY

Disclosed herein are improved methods, systems, and devices for controlling a power supply level of series interconnected electronic circuits, providing a dynamic balancing process of the activities of the interconnected electronic circuits, by means of control interactions between the electronic circuits and the associated power supply.

In one embodiment, a system includes a processor having a plurality of processor cores connected in series, a power source unit coupled to the processor to supply power to the plurality of processor cores, and a control unit coupled to each of the plurality of processor cores and to the power source unit. The control unit monitors activity levels of the processor cores and adjusts a level of the supplied power in response to the monitored activity levels.

In another embodiment, a system includes a circuit having a plurality of electronic function blocks interconnected in series, a power source unit coupled to the circuit, for supplying power to the plurality of electronic function blocks, and a control unit coupled to each of the plurality of the electronic function blocks and to the power source unit. The control unit is configured to monitor activity levels of each of the electronic function blocks. The control unit is configured to adjust the activity level of each of the plurality of electronic function blocks, determine a voltage level suitable for the corresponding adjusted activity level, and adjust the power supplied to each of the plurality of electronic function blocks in order to achieve the corresponding determined voltage level at each of the plurality of electronic function blocks.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the invention by way of example only and not by way of limitation.

DETAILED DESCRIPTION

Figure 1:
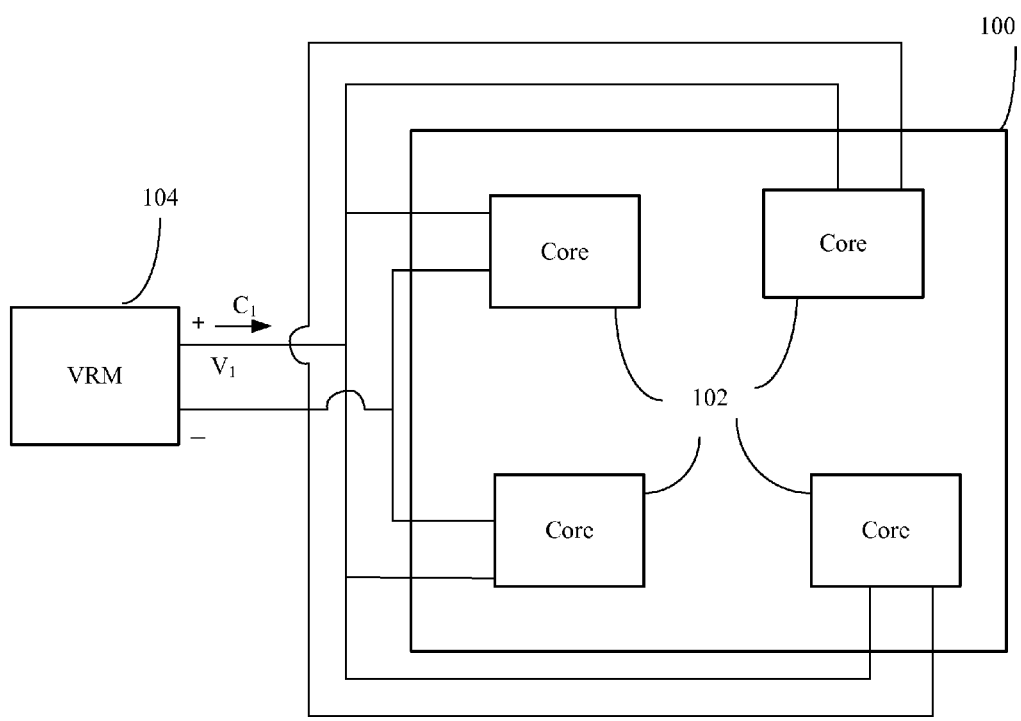
FIG. 1 is a schematic block diagram illustrating a conventional parallel VRM connection to a four-core processor.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

One embodiment is directed to a system that includes a processor having a plurality of processor cores connected in series, a power source unit coupled to the processor to supply power to the plurality of processor cores, and a control unit coupled to each of the plurality of processor cores and to the power source unit. The control unit monitors activity levels of the processor cores and adjusts a level of the supplied power in response to the monitored activity levels. This system may represent a "homogeneous" application for which activity is to be substantially matched amongst the plurality of processor cores to allow corresponding voltages in this series connection to be substantially matched.

In another embodiment, a system includes a plurality of function blocks or units connected in series within an integrated circuit, and an activity distributing unit or control unit coupled to each function block. The control unit is configured to monitor local activities of the function blocks and make adjustments to achieve local target voltage values for the function blocks, which may differ among the various function blocks. This system may represent a "heterogeneous" application in which target voltage levels may differ among parts in a series connection.

Both of these above-introduced systems may lead to higher voltages on an integrated circuit (IC) based on the sum of voltages supplied to individual function blocks or processor cores inside the IC. These two systems can be termed "intra-chip" series power supply connection strategies.

In another embodiment, a system, which can be homogeneous or heterogeneous, includes a series connection of a plurality of ICs, each with a coupled control unit that monitors activity levels and adjusts activity levels to achieve a target distribution of supply voltages across the plurality of ICs. One objective is to achieve a target power supply voltage level at each individual IC by adjusting activity levels in the series connection. This system can be termed an "interchip" series strategy with unified series power supply.

In a further embodiment, a system includes a series connection of a plurality of circuit boards or electronic circuits that involve multiple ICs and other components. This system represents an "interboard" series strategy with unified series power supply.

Based on the above-introduced systems, the series interconnection strategies can be extended to as low a level in electronic design or as high a level, or as comprehensive a set of levels, as desired. Furthermore, a system activity can be controlled, in a manner that determines the local voltage supply, at various levels or combined levels of hierarchy, ranging from on-chip activity adjustment to board-level activity adjustment and all other scales.

In addition, each of the above-introduced systems can also benefit from providing feedback and information to the power supply and by interpreting more comprehensive information from the power supply beyond what is available conventionally. For example, power supply dynamics are relatively slow and impose delay in a corresponding system. If the electronic circuits that consume power provide advance information about activity level changes to the power supply, the power supply can begin to make desirable adjustments in advance, anticipating the changes and preparing to maintain the desired voltage level as the changes occur. Further, the power supply might report its slew rate capabilities at a particular time, and the associated control unit coupled to the electronic circuits may limit the rate of change in activity levels of the electronic circuits to avoid exceeding the available slew rate. Such enhancement of the control unit—dynamic information exchange and interactive dynamic control in collaboration with power supply controls—can lead to improved system performance and efficiency.

In addition to control units that monitor voltage and activity level and adjust activity levels to achieve desired voltage, any of the above-introduced systems can also include an activity scheduler. The activity scheduler includes a function block that manages when various circuit operations are expected to take place, adjusting the timing, sequencing, and even time-rate-of-change of various operations to enhance the actions of activity management. Activity scheduling is unusual within or among ICs, and has not been employed to achieve dynamic benefits in power supplies, although conventional methods such as sleep modes are a form of activity management intended to save energy. As such, at least one purpose of the activity scheduler involves helping to provide a maximum dynamic performance and efficiency results from the power supply by scheduling activity based on direct collaboration among electric circuits and the unified power supply.

Figure 2:
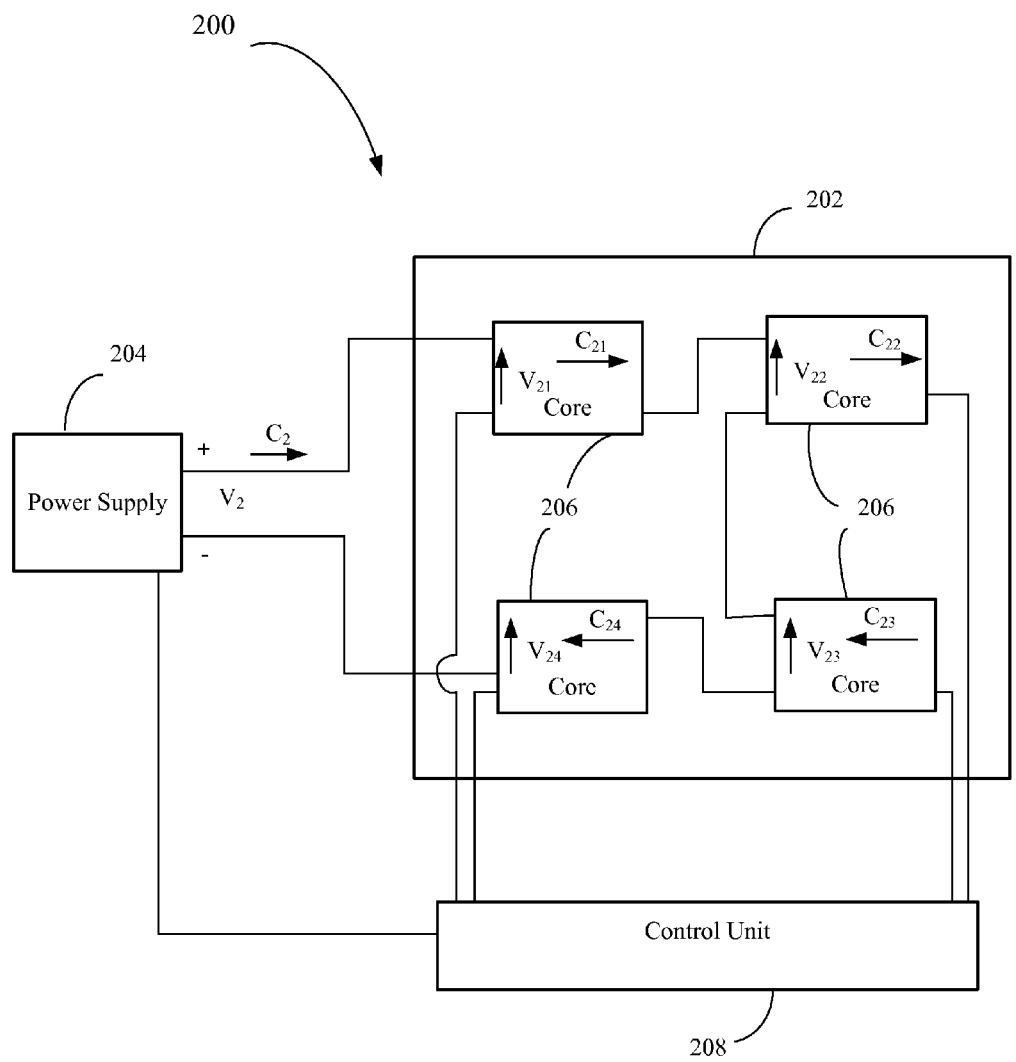
FIG. 2 is a schematic block diagram illustrating a microprocessor having four series-interconnected processor cores.

Now referring to FIG. 2, an embodiment of a system 200, which includes a multi-core processor 202 connected to a power supply 204, is shown. Processor 202 includes four digital application modules ("DAMs") or processor cores 206 interconnected electrically in series. Power supply 204 is configured to perform power conversion as needed to dynamically match the power demand or load of DAMs 206. Each of DAMs 206 is coupled to a control unit 208, which monitors and controls their corresponding voltages and activity levels. Control unit 208 is a computing system coupled to power supply 204 for managing its power delivery as dictated by the activity levels of DAMs 206.

During operation, control unit 208 is configured to communicate with power supply 204 about needs and capabilities of DAMs 206. As such, dynamic performance and capability of system 200 can be enhanced by suitable communication and feedback between DAMs 206, via control unit 208, and power supply 204.

In one embodiment, the connections between the different elements of system 200 are provided through a board, such as an integrated circuit (IC) board (not shown), which can drastically simplify wiring and reduces connected pin requirements. This series interconnection of the DAMs 206 can lead to higher voltages and lower currents than if the DAMs 206 were connected in parallel as in the FIG. 1 arrangement discussed above. Because there are four series interconnected DAMs 206, processor 202 may operate at four (4) times a core or DAM voltage $V_{21}$-$V_{24}$.

Multi-core processor 202 is well suited to the above-discussed series-connected embodiments, since it can provide high functionality DAMs 206. Programmable applications, in which computer software may be intrinsically parallelizable, can make it possible to achieve sufficient operational independence when mapped on to processor 202. For example, whereas a parallel connected four-core processor 100, as shown in FIG. 1, is configured to operate at an input voltage $V_1$ of about 1.2 V and a current input $C_1$ of about 40 A, series-connected four-core processor 202 can operate at a voltage input $V_2$ of about 4.8 V and a current input $C_2$ of about 10 A. As such, the power conversion performed at such higher voltages, e.g. 4.8 V, can become more efficient and can offer improved dynamic and regulation performance than the power conversion performed at lower voltages, e.g. 1.2 V.

As such, four-core processor 202 can gain the benefits of a power consumption reduction as voltages decrease, while power supply 204 is not impacted by the power consumption reduction and can retain its desired high efficiency. With the series connection, each DAM 206 may need to have the same average drawn current in steady state, which can be provided by tuning activity levels within each DAM 206 through hardware and software operating management. Control unit 208 can accomplish this activity tuning through a tuning of a total computational load, a frequency of operation, scheduling, binding, and signal statistics in each DAM 206. Since the average DAM currents $C_{21}$-$C_{24}$ are the same, this can result in a substantial matching of average drawn currents, and hence the voltages $V_{21}$-$V_{24}$ observed at the individual DAMs 206, which in turn meet their internal operating requirements.

In a homogeneous scenario of four-core processor 202, each DAM 206 may need to have its operation balanced with those of the other DAMs 206 such that all of the DAMs 206 have almost identical activity levels and therefore correspondingly expected voltages.

There may be operating circumstances of processor 202 during which current matching between DAMs 206 may not be feasible. For example, there may be circumstances when a processor activity is substantially low and some of DAMs 206 may need to be idled or inactivated. In such circumstances, external power supply 204 may be directed to adjust its voltage $V_2$ to a new, more suitable, level, and the inactive or idle DAMs 206 may not be supplied with power. In the embodiment of FIG. 2, if only two DAMs 206 were needed, power supply 204 may be commanded by control unit 208 to readjust to its voltage $V_2$ to about 2.4 V, and two of the DAMs 206 are then not supplied. Since inactivity is usually associated with low power levels, voltage decreases are less problematic when several DAMs 206 become inactive and are disconnected.

For the example of series configurations, shared signals and outputs, such as communication with an external memory, may need to be at substantially the correct low voltage levels to interface with more conventional parts. These communications can be accomplished either with various known techniques for voltage level shifting, or by making use of optical data interconnections that avoid the voltage level requirements. Level shifting is applicable in multi-core applications, since it is common for processors and external hardware to operate at different voltage levels. Capacitive coupling is another approach that can be implemented for these communications.

Figure 3:
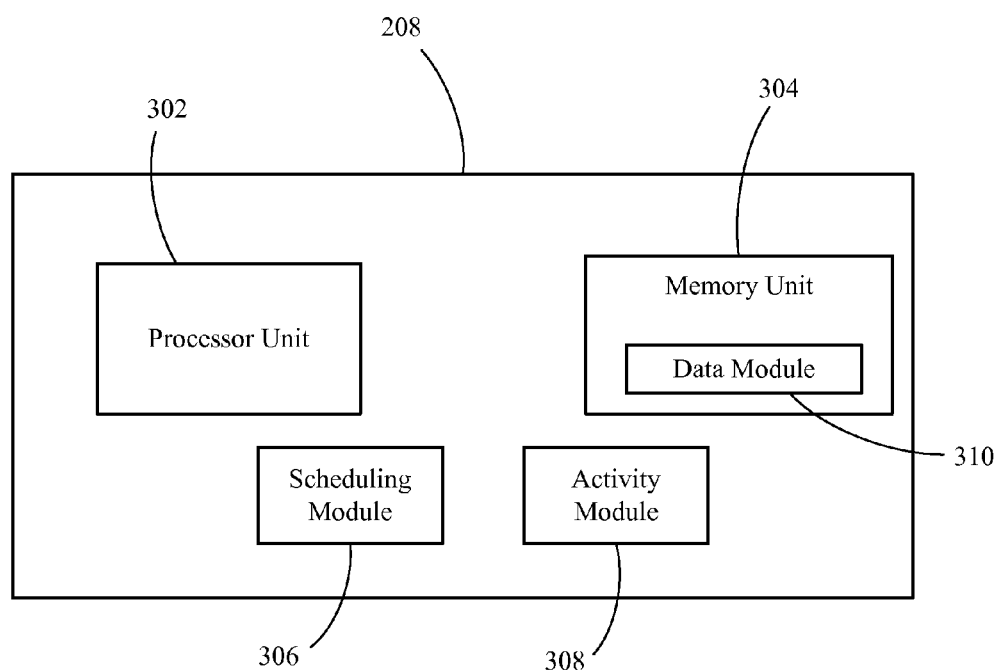
FIG. 3 is a schematic block diagram illustrating components of the control unit of FIG. 2.

Now referring to FIG. 3, control unit 208 includes a processor or processing unit 302, a memory unit 304, a scheduler or scheduling module 306, and a supervisory software or activity module 308. Processing unit 302 is configured to execute instructions and to carry out operations associated with control unit 208. For example, using instructions retrieved from memory unit 304, processor unit 302 may control the reception and manipulation of input and output data between power supply 204, DAMs 206, scheduling module 306, and activity module 308.

Processing unit 302 can be implemented on a single-chip, multiple chips or multiple electrical components. For example, various architectures can be used for processor unit 302, including dedicated or embedded processor or microprocessor (µP), single purpose processor, controller or a microcontroller (µC), application-specific integrated circuit (ASIC), any combination thereof, and so forth. In most cases, processor unit 302 together with an operating system operates to execute computer code and produce and use data.

Memory unit 304 generally provides a place to store computer code and data, in data module 310, that are used by the other components of control system 202. Memory unit 304 may include but not limited to non-volatile memory, such as read-only memory (ROM, flash memory, etc.), volatile memory, such as random-access memory (RAM), a hard disk drive and/or the like.

As stated above, scheduling module 306 can includes a function block (not shown) that manages when various operations of DAMs 206 are expected to take place, by adjusting the timing, sequencing, and even time-rate-of-change of the various operations to enhance activity management of DAMs 206.

Activity module 308 is configured to monitor activity levels of DAMs 206 and provide activity level data to power supply 204 so that its output power level is adjusted, via appropriate power conversion, in response to the monitored activity levels. In addition, based on the monitored activity levels of DAMs 206, activity module 308 is configured to trigger power adjustments by power supply 204 in order to achieve local target voltage values for DAMs 206, which may differ among DAMs 206. In FIG. 3, control unit 208 is shown as being a unit that is coupled to but distinct from processor 202. Alternately, control unit 208 may be integral to processor 202 and distributed amongst DAMs 206.

The above-discussed series-connected DAM configurations enable a substantially more efficient overall electric power conversion process for microprocessors than those of conventional parallel-connected core configurations. Typically, an overall conversion process might start with 120 V AC at 60 Hz, is converted down to 1 V DC at up to 50 A in three power conversion stages. Even if each power conversion stage is 90% efficient, only 73% of an incoming power is delivered to the processor. In a first beneficial aspect of the above-discussed series-connected DAM configurations, one of these three stages can be removed and another stage can be made substantially more efficient. As such, a conversion process that includes one conversion stage at 90% efficiency followed by another conversion stage at 94% efficiency, for example, yields an overall efficiency of 85%, thereby cutting nearly in half the power lost by the three stage conversion process.

In accordance with a second beneficial aspect of the above-discussed series-connected DAM configurations, a multicore processor may be supplied with voltages at higher levels that support much more efficient and effective interconnections. A suitable processor may operate at approximately 12 V, for example, to take better advantage of a board-level power distribution. High DAM counts (such as 40 or more) may lend themselves to direct a 48 V power supply, which is substantially more efficient. In addition, a decoupling of power supply requirements from DAM voltage levels become more suitable when the DAM count is high.

In a third beneficial aspect of the above-discussed series-connected DAM configurations, a sensitivity to power variations and to associated external parts can be greatly reduced. As stated above, conventional low-voltage processors tend to require large numbers of decoupling capacitors to support extreme current slews that they can produce. However, at low voltages, capacitors store limited energy and do not perform the job well. In contrast, at higher voltages in series connections, the current slew rates are far lower, but capacitor energy storage is also far higher, which can have major beneficial impact on system cost and performance.

In another beneficial aspect of the above-discussed series-connected DAM configurations, by connecting DAMs 206, i.e., load elements, in series, architectural aspects of power supply 204 need not be as important as in the parallel interconnection of DAMs 106. In order to manage activity balance or provide local voltage regulation of individual DAMs 206, active dynamic balancing of processor activity is implemented. For example, if one DAM 206 begins to sense excessive input voltage, then its activity level can be increased, whereas if another DAM 206 sees low input voltage, then its activity can be decreased. This dynamic activity balancing process can be implemented through scheduling and activity modules 306 and 308, respectively, i.e., through software strategies, and through hardware strategies.

Figure 4:
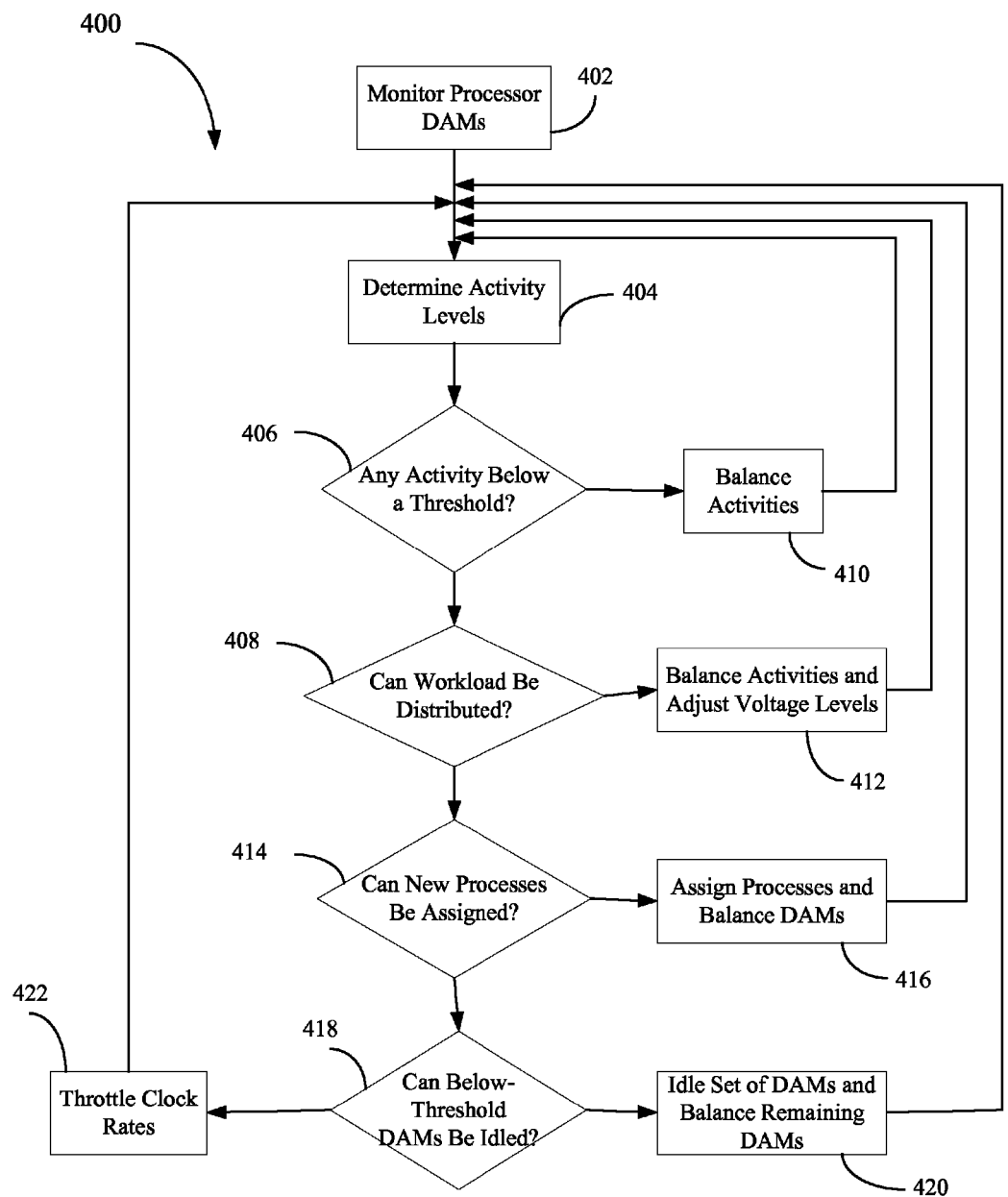
FIG. 4 is flow diagram illustrating a method for dynamically managing a power supply to the four series-interconnected processor cores of the microprocessor of FIG. 2.

Now referring to FIG. 4, a flow diagram illustrating an embodiment of the dynamic activity balancing process or method 400 is shown. Under a software strategy, activity module 308 that assigns program processes among DAMs 206 is augmented to generate "activity-matched" process assignments. Activity module 308 is configured to monitor information from individual cores 206, and to make adjustments in real time to keep the balance tight. Under the hardware strategy, local core clock rates or specific internal task assignments are throttled in real time to maintain tight balance. In addition, some external energy storage (not shown) can be provided to avoid extreme needs for instantaneous power matching.

As illustrated in FIG. 4, during operation a process monitors DAMs 206, at Step 402, to determine their activity levels and whether they draw substantially identical currents, thereby maintaining a tight balance between them, Step 404. If an activity level of anyone of the DAMs 206 falls below a predetermined threshold, Step 406, then control unit 208 determines whether the total workload can be distributed to reach a substantially tight balance between DAMs 206, Step 408. Otherwise, control unit 208 continues the monitoring and balancing of activity levels of DAMs 206, Step 410. If the total workload can be distributed, then a select set of running processes are redistributed amongst DAMs 206, and voltages are raised or lowered as appropriate, Step 412. If the total workload can not be distributed, then control unit 208 determines whether additional or new processes can be assigned to processor 202, Step 414. In the affirmative, the new processes are assigned to DAMs 206 as appropriate to establish a tight balance between them, Step 416. Otherwise, control unit 208 determines which of the below-threshold active DAMs 206 can be idled or made inactive, Step 418. In the affirmative, a subset of the below-threshold active DAMs 206 is made idle or inactive, and their loads are redistributed to establish a tight balance between the still-active DAMs 206, Step 420. Otherwise, control unit 208 throttles clock rates and/or internal task assignments of the below-threshold active DAMs 206, Step 422.

An overall impact of the above-discussed process in a large data center can be substantial. In a typical data center, only about half of the incoming electrical energy is delivered to information processing electronics at the point of end use. More than 10% of the total energy is lost during the final conversion stages down to chip level. By reducing stage counts, improving regulation, and supporting relatively efficient conversion that is possible at higher voltage levels, this process can reduce energy consumption in data centers and other large-scale information technology systems by about 10%.

This process also removes some of the practical barriers to further DAM voltage reduction. Today, a voltage reduction at an end point DAM (which is done to reduce power requirements per unit of computation) tends to transfer power loss from the DAM to the power supply. Often there is a net increase in overall energy consumption, since it is increasingly difficult to perform efficient power conversion at decreasing voltages. With this process, low voltages for many DAMs 206 can still support relatively high voltage power conversion. For example, an application that may operate at about a 0.2 V voltage can be managed in a 64 DAM processor by supplying a series core combination with a 12 V voltage. This is more efficient and effective than a single power supply that must deliver 0.2 V. Additional advantages become even more apparent when power is considered. A 64-core processor operating at 0.2 V and 1 W per core requires a 0.2 V, 320 A power supply in a parallel connection, whereas a series connection requires 12.8 V at 5 A. The parallel specifications are far beyond the state of the art and may not be possible to achieve given high requirements for current slews.

Figure 5:
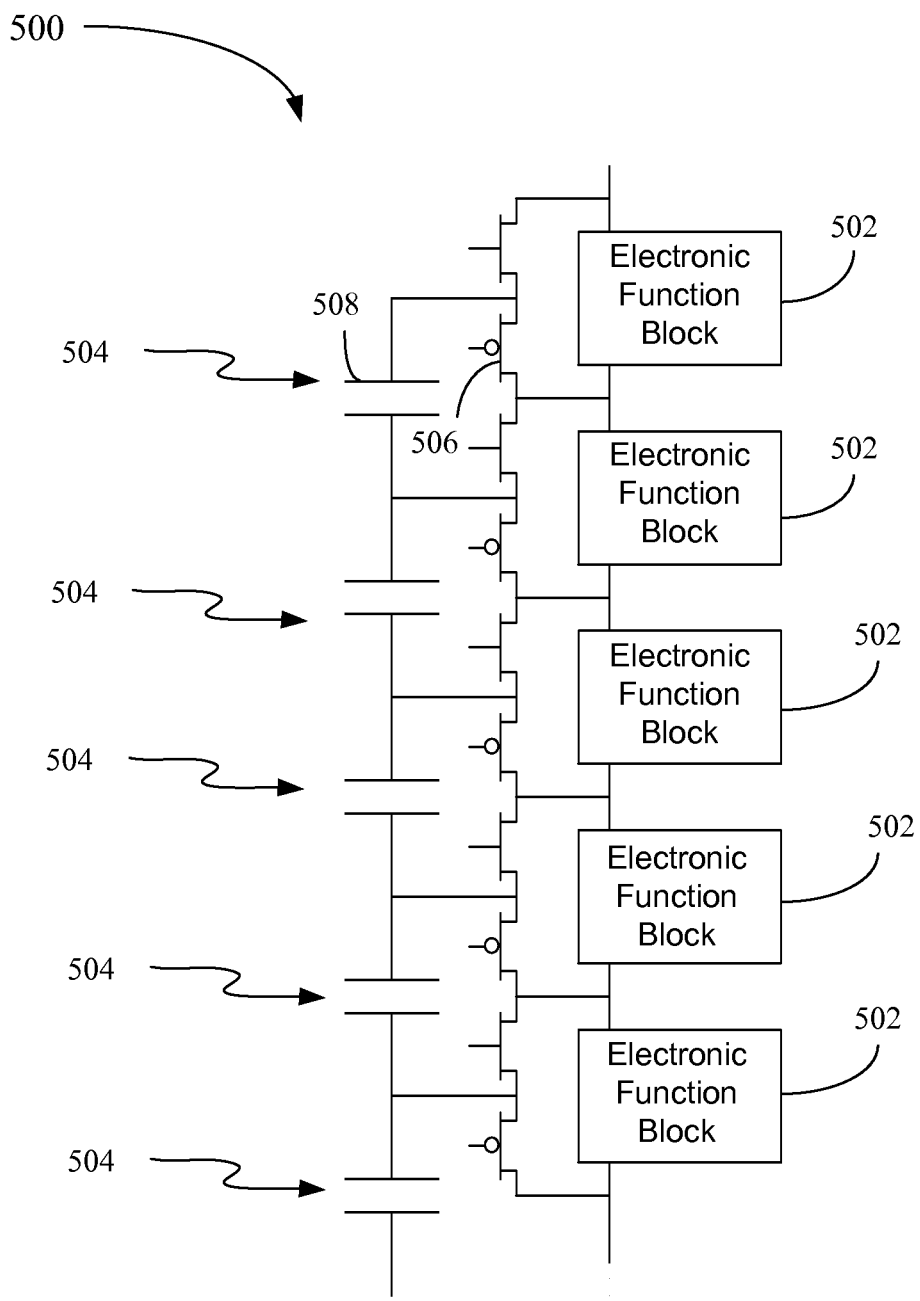
FIG. 5 is schematic block diagram illustrating a plurality of electronic processing circuits connected in series and an associated controlling circuitry.

Now referring to FIG. 5, an embodiment of a circuit 500 includes a plurality of DAMs or electronic function blocks 502 connected in series and controlled by monitoring circuits 504, associated with control unit 208 (not shown in FIG. 5). Electronic process blocks 502 can be microprocessors, digital circuits, analog circuits, or any other electricity-consuming functions. Control circuits 504 include transistors 506 and capacitors 508 to provide local charge exchanges between electronic processes 502. Transistors 506 are configured to act as switches to alternate a connection from each capacitor 508 to its upper or previous electronic process block 502 and its lower or next electronic process block 502. With this arrangement, the current can flow between any electronic process blocks 502 that show voltage imbalance. Any extra current can be distributed among electronic process blocks 502 near electronic process block 502 that may require extra current. The current distribution process works better as the number "n" of electronic process blocks 502 becomes larger, and to a first approximation, the extra current drawn from the associated power supply is I+ΔI/n. Given that any practical system is likely to have at least a modest mismatch between electronic process blocks 502, the efficiency improvement can be substantial. The scaling is even more beneficial, as n can be arbitrarily large with this approach. The incremental efficiency of this circuit arrangement is proportional to the relative voltage differences, and may approaches 100% as voltage matching becomes substantially ideal.

Although control circuits 504 are discussed as including transistors 506 and capacitors 508 to provide local charge exchanges between electronic processes 502. Alternately, in one embodiment, control circuits 504 may include inductive elements (not shown) that serve to provide the local charge exchanges. In another embodiment, control circuits may include both capacitive and inductive elements.

Figure 6:
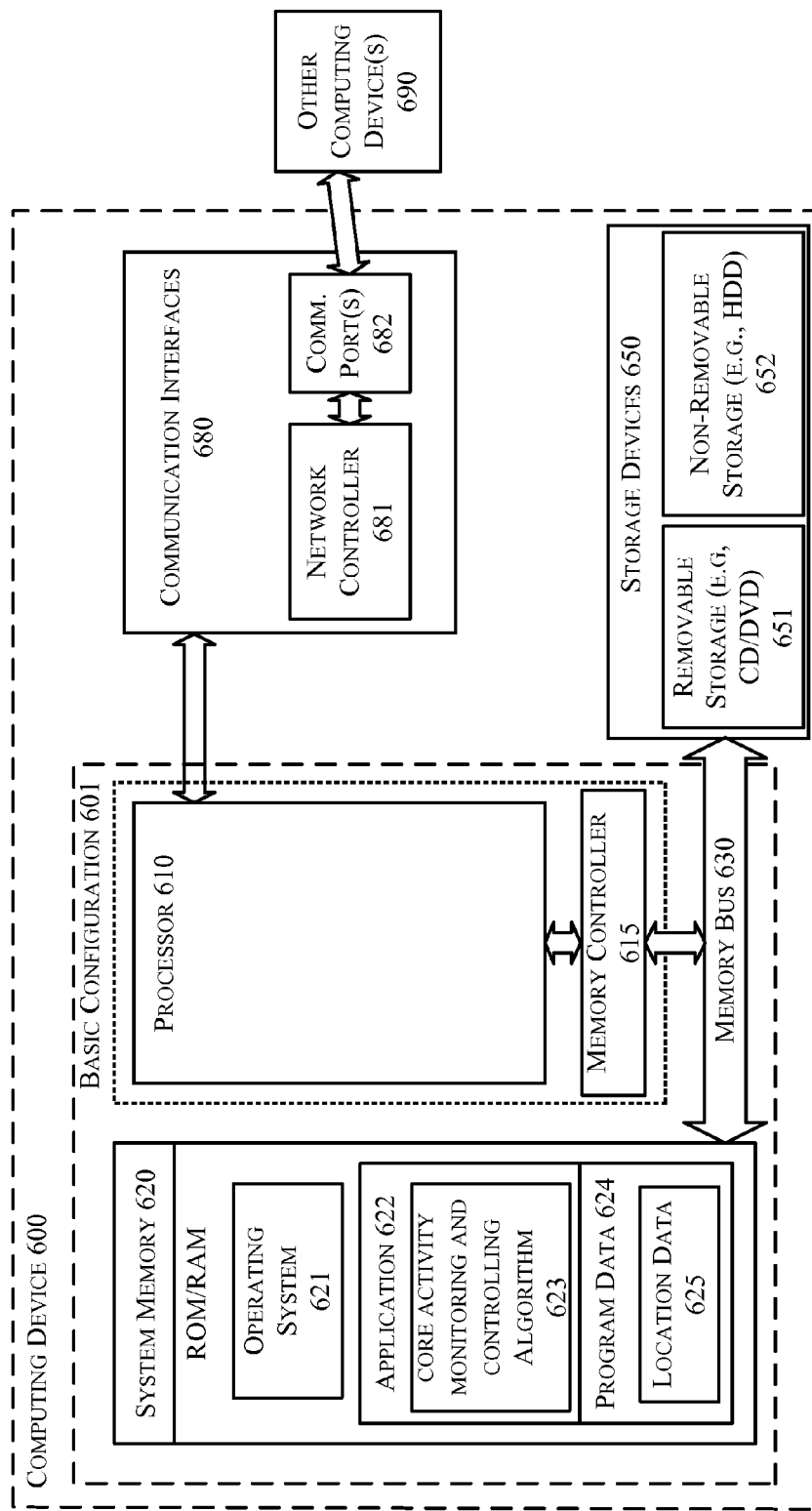
FIG. 6 is a functional block diagram illustrating an example computing device associated with the control unit of FIG. 2.

In accordance with an embodiment of the method for determining for controlling a power supply based on activities of electronic circuits, control unit 208 includes memory unit 306, which in turn includes a non-transitory computer readable storage medium, discussed hereafter with regard to FIG. 6 that contains instructions that cause control unit 208 to perform the method.

FIG. 6 is a functional block diagram illustrating an example computing device 600 used in a control unit 208 that is arranged in accordance with at least some embodiments described herein. In an example configuration 601, computing device 600 may include one or more processors 610 and system memory 620. A memory bus 630 can be used for communicating between processor 610 and system memory 620. Depending on the desired configuration, processor 610 can be of any type including but not limited to a microprocessor (µP), a microcontroller (µE), a digital signal processor (DSP), or any combination thereof. A memory controller 615 can also be used with processor 610, or in some implementations, memory controller 615 can be an internal part of processor 610.

Depending on the desired configuration, system memory 620 can be of any type including but not limited to volatile memory (such as RAM), non-volatile memory (such as ROM, flash memory, etc.) or any combination thereof. System memory 620 typically includes one or more applications 622, and program data 624. Application 622 may include a core activity monitoring and controlling algorithm 623 that is arranged to provide inputs to and collect data from the electronic circuits, in accordance with the present disclosure. Program Data 624 may include scheduling data 625 of the electronic circuits. In some example embodiments, application 622 can be arranged to operate with program data 624 on an operating system 621. This described basic configuration is illustrated in FIG. 6 by those components within dashed line 601. Operating systems are generally well known and will not be described in greater detail.

Computing device 600 can have additional features or functionality, and additional interfaces to facilitate communications between the basic configuration 601 and any devices and interfaces. For example, the data storage devices 650 can be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, removable and non-removable media implemented in any method or technology for storage of information, such as computer readable instructions, data structures, program modules, or other data.

System memory 620, removable storage 651, and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of computing device 600.

Computing device 600 can also include communication interface 680, which may include a network controller 681, which can be arranged to facilitate communications with one power supply 304 and processor 302 over a network communication via one or more communication ports 682. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Figure 7:
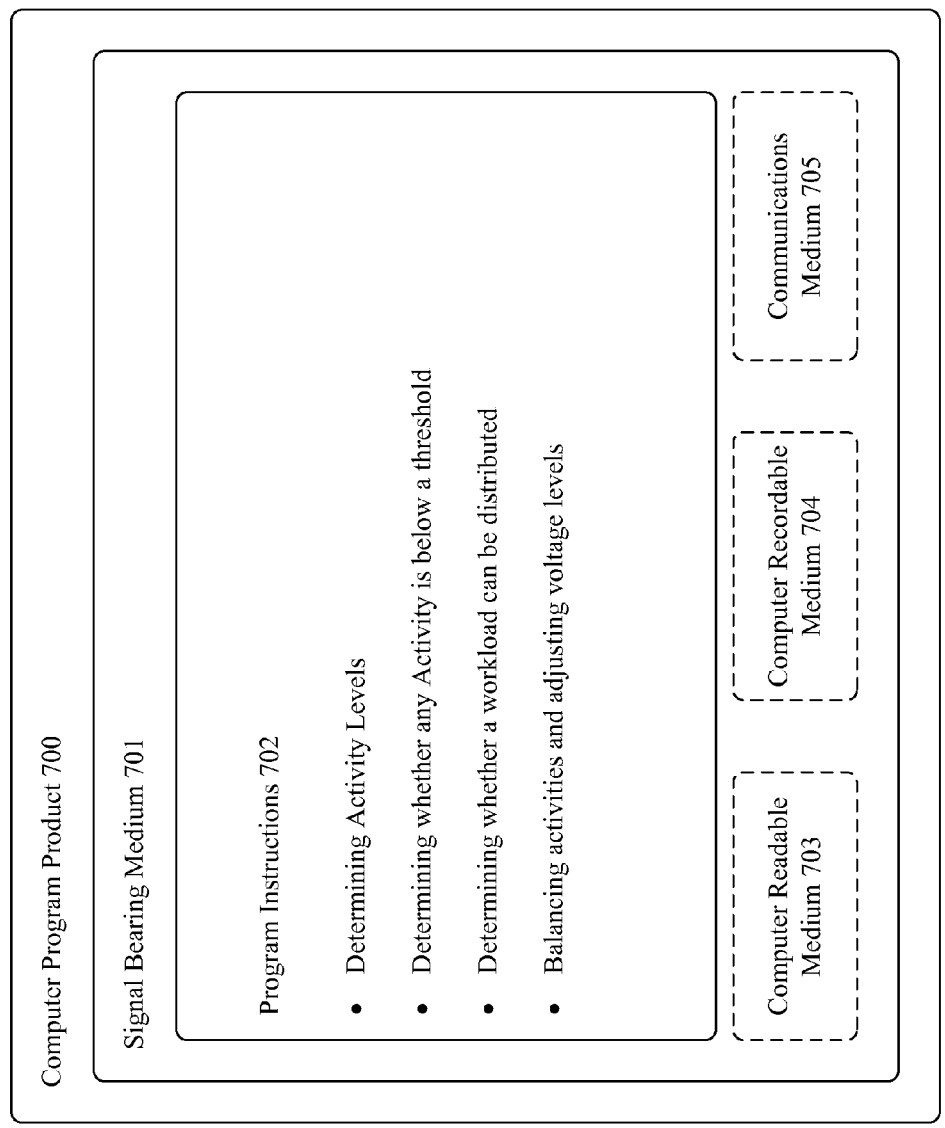
FIG. 7 is a schematic diagram illustrating a conceptual partial view of an example computer program associated with the method of FIG. 4.

In some embodiments, the disclosed methods may be implemented as computer program instructions encoded on a computer-readable storage media in a machine-readable format. FIG. 7 is a schematic illustrating a conceptual partial view of an example computer program product 700 that includes a computer program for executing a computer process on a computing device, arranged according to at least some embodiments presented herein. In one embodiment, the example computer program product 700 is provided using a signal bearing medium 701. The signal bearing medium 701 may include one or more programming instructions 702 that, when executed by one or more processors may provide functionality or portions of the functionality described above with respect to FIGS. 1-5. Thus, for example, referring to the embodiment shown in FIG. 4, one or more features of Steps 402, 404, 406, 408, 410, 412, 414, 416, 418, 420, and/or 422, may be undertaken by one or more instructions associated with the signal bearing medium 701.

In some examples, the signal bearing medium 701 may encompass a non-transitory computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming with the IEEE 802 family of standards or other transmission protocols).

The one or more programming instructions 702 may be, for example, computer executable and/or logic implemented instructions. In some examples, a computing device such as computing program product 700 of FIG. 7 may be configured to provide various operations, functions, or actions in response to the programming instructions 702 conveyed to the computing device 700 by one or more of the computer readable medium 703, the computer recordable medium 704, and/or the communications medium 705.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A system comprising:
a circuit having a plurality of electronic function blocks electrically interconnected in series;
a power source unit coupled to the circuit, for supplying power to the plurality of electronic function blocks electrically interconnected in series; and
a control unit coupled to each of the plurality of the electronic function blocks and to the power source unit, wherein the control unit is configured to monitor activity levels of each of the electronic function blocks, and wherein the control unit adjusts the activity level of each of the plurality of electronic function blocks, determines a voltage level suitable for the corresponding adjusted activity level, determines a current level suitable for the plurality of function blocks electrically interconnected in series, and adjusts the power supplied to each of the plurality of electronic function blocks in order to achieve the corresponding determined voltage and current levels at each of the plurality of electronic function blocks.

2. The system of claim 1, wherein each of the plurality of electronic function blocks comprises one of a processor core, a digital application module, and a plurality of electronic circuits.

3. The system of claim 1, wherein the control unit is configured to determine whether one of the activity levels is below a predetermined activity threshold, and based on the determination adjusts activities amongst the plurality of electronic function blocks to mitigate the below threshold activity.

4. The system of claim 1, wherein the control unit determines whether an activity can be assigned to the plurality of electronic function blocks, and based on the determination that the activity can be assigned, balances prior activity levels to add the activity to the plurality of electronic function blocks.

5. The system of claim 4, wherein the balancing of the activity levels includes assigning the activity to only one of the plurality of electronic function blocks.

6. The system of claim 4, wherein the balancing of the activity levels includes distributing the activity amongst a subset of the plurality of electronic function blocks.

7. The system of claim 3, wherein adjusting activities amongst the plurality of electronic function blocks to mitigate the below threshold activity comprises:
idling one of the plurality of electronic function blocks; and
balancing the activity levels of the remaining non-idle electronic function blocks.

8. The system of claim 3, wherein adjusting activities amongst the plurality of electronic function blocks to mitigate the below threshold activity comprises:
deactivating one of the plurality of electronic function blocks; and
balancing the activity levels of the remaining non-idle electronic function blocks.

9. In a computing system for controlling a power supply coupled to a plurality of function blocks, a method comprising:
a processor and a memory, the memory including instructions, the processor executing the instructions for:
monitoring activity levels of each of the plurality of electronic function blocks,
determining whether the activity level of an individual electronic function block needs adjusting;
based on the determination that the activity level of the individual electronic function block needs adjusting, determining a voltage level suitable for the individual electronic function block;
adjusting the power supplied to the plurality of electronic function blocks in order to achieve the determined voltage level; and
determining whether an activity can be assigned to the plurality of electronic function blocks; and
based on the determination that the activity can be assigned, balancing prior activity levels to add the activity to the plurality of electronic function blocks.

10. The method of claim 9, further comprising:
determining that one of the activity levels is below a predetermined activity threshold; and
based on the determination, adjusting activities amongst the plurality of electronic function blocks to mitigate the below threshold activity.

11. The method of claim 9, wherein the balancing of the activity levels includes assigning the activity to only one of the plurality of electronic function blocks.

12. The method of claim 9, wherein the balancing of the activity levels includes distributing the activity amongst a subset of the plurality of electronic function blocks.

13. The method of claim 10, wherein adjusting activities amongst the plurality of electronic function blocks to mitigate the below threshold activity comprises:
idling one of the plurality of electronic function blocks; and
balancing the activity levels of the remaining non-idle electronic function blocks.

14. The method of claim 10, wherein adjusting activities amongst the plurality of electronic function blocks to mitigate the below threshold activity comprises:
deactivating one of the plurality of electronic function blocks; and
balancing the activity levels of the remaining non-deactivated electronic function blocks.

15. In a computing system for controlling a power supply coupled to a plurality of function blocks, a method comprising:
a processor and a memory, the memory including instructions, the processor executing the instructions for:
monitoring activity levels of each of the plurality of electronic function blocks,
determining in-advance whether the activity level of an individual electronic function block will change;
based on the in-advance determination that the activity level of the individual electronic unction block will change, preparing the power supply to match the in advance determined activity level;
adjusting the power supply to the plurality of electronic function blocks to achieve the determined activity level; and
determining a slew rate of the power supply; and
adjusting a rate of change of the in advance determined activity level to avoid exceeding the determined slew rate.

16. A non-transitory computer readable storage medium containing program instructions that cause a computing system to perform a method for controlling a power supply coupled to a plurality of function blocks, comprising:
monitoring activity levels of each of the plurality of electronic function blocks electrically interconnected in series,
determining whether the activity level of an individual electronic function block needs adjusting;

based on the determination that the activity level of the individual electronic function blocks needs adjusting, determining for the individual electronic function block-voltage and current levels suitable for adjusting the power supplied to the plurality of electronic function blocks in order to achieve the determined voltage and current levels.

17. The non-transitory computer readable storage medium of claim 16, further comprising:
determining that one of the activity levels is below a predetermined activity threshold; and
based on the determination, adjusting activities amongst of the plurality of electronic function blocks to mitigate the below threshold activity.

18. The non-transitory computer readable storage medium of claim 16, further comprising:
determining whether an activity can be assigned to the plurality of electronic function blocks; and
based on the determination that the activity can be assigned, balancing the activity levels to add the activity to the plurality of electronic function blocks.

19. The non-transitory computer readable storage medium of claim 18, wherein the balancing of the activity levels includes assigning the activity to only one of the plurality of electronic function blocks.

20. The non-transitory computer readable storage medium of claim 18, wherein the balancing of the activity levels includes distributing the activity amongst a subset of the plurality of electronic function blocks.

* * * * *